March 10, 1953 R. E. KINKEAD 2,631,214
COMPOSITE METAL MANUFACTURING APPARATUS
Filed Sept. 8, 1948 4 Sheets-Sheet 1
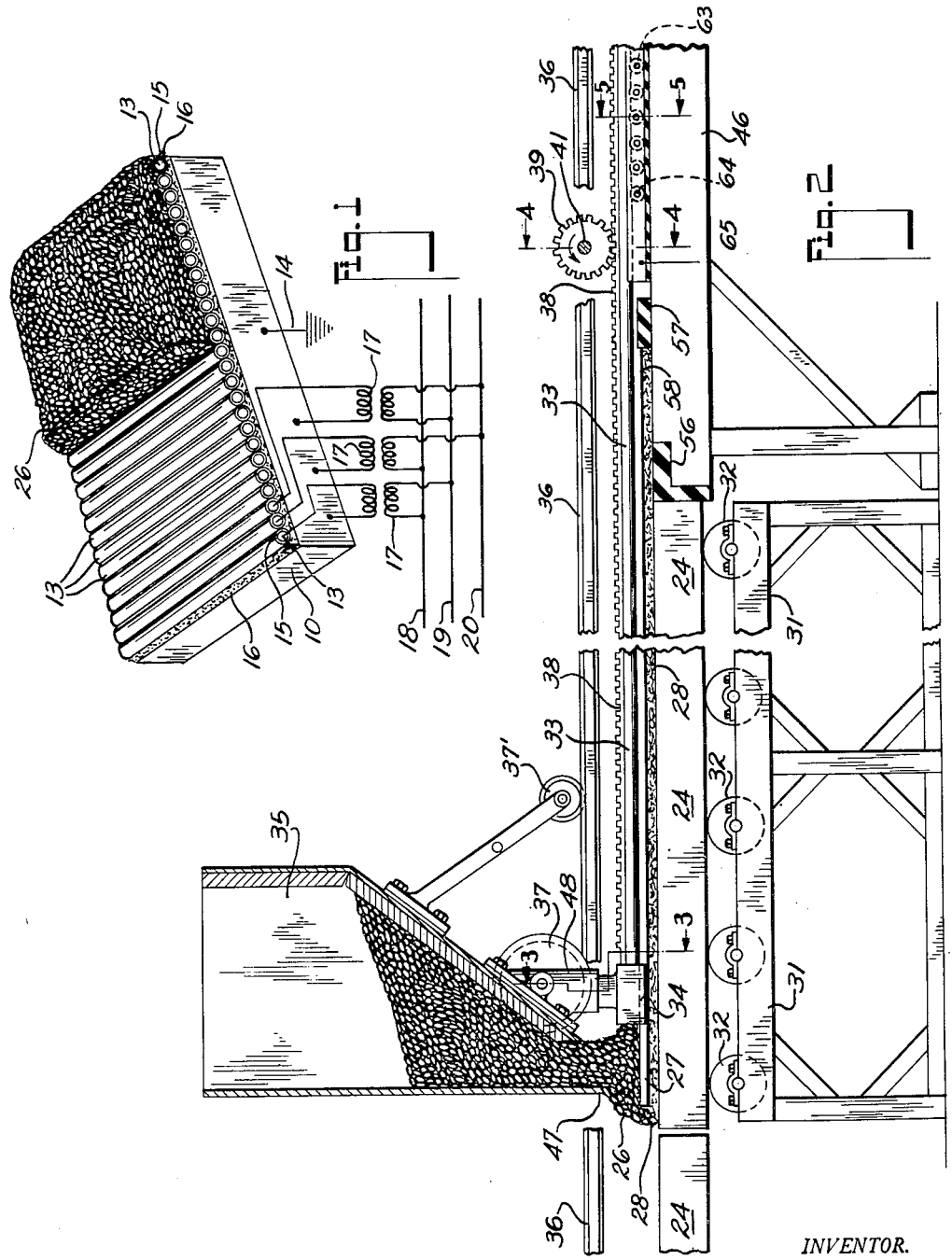
INVENTOR.
ROBERT E. KINKEAD
BY Richey & Watts
ATTORNEYS March 10, 1953 R. E. KINKEAD 2,631,214
COMPOSITE METAL MANUFACTURING APPARATUS
Filed Sept. 8, 1948 4 Sheets-Sheet 2

INVENTOR.
ROBERT E. KINKEAD
BY Richey & Watts
ATTORNEYS

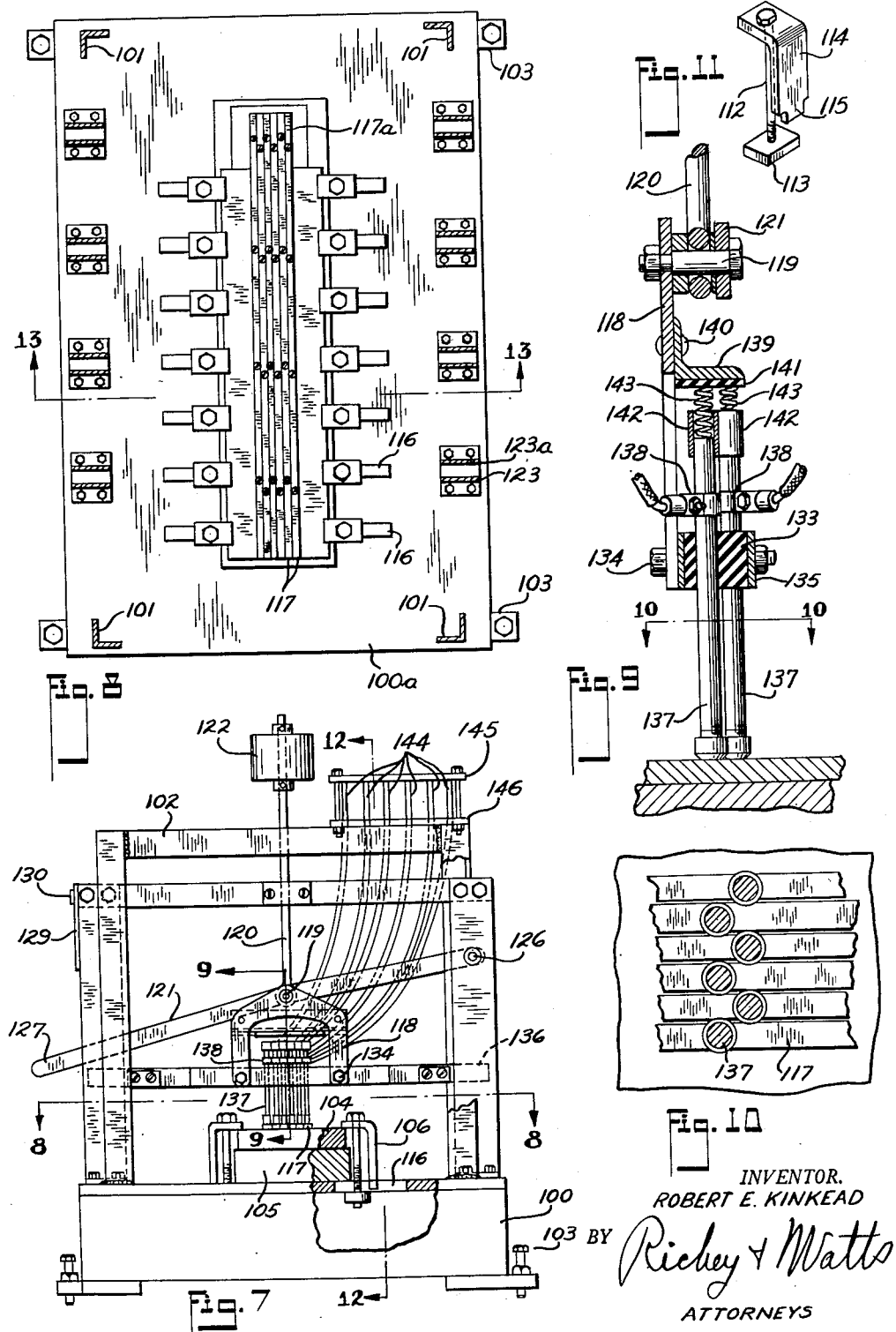

March 10, 1953 — R. E. KINKEAD — 2,631,214
COMPOSITE METAL MANUFACTURING APPARATUS
Filed Sept. 8, 1948 — 4 Sheets-Sheet 4

INVENTOR.
ROBERT E. KINKEAD
BY Richey & Watts
ATTORNEYS

Patented Mar. 10, 1953

2,631,214

UNITED STATES PATENT OFFICE 2,631,214

COMPOSITE METAL MANUFACTURING APPARATUS

Robert E. Kinkead, Shaker Heights, Ohio, assignor to The Cleveland Trust Company, Cleveland, Ohio, a corporation of Ohio, as trustee Application September 8, 1948, Serial No. 48,182

13 Claims. (Cl. 219—8)

My invention relates to the manufacture of composite metal, and is a continuation-in-part of my co-pending application, Serial No. 579,255, filed February 22, 1945, now abandoned, which application was a continuation-in-part of my application Serial No. 406,695, filed August 13, 1941, now Patent No. 2,402,165, issued June 18, 1946. The processes disclosed herein and in the said parent applications are claimed in my co-pending application Serial No. 240,924, filed August 8, 1951, which is a continuation-in-part of the instant application and of my said application Serial No. 579,255, filed February 22, 1945.

An object of my invention is to provide improved methods and apparatus for cladding, and especially for applying a layer of metal to another by electric arc fusion. Another object is to provide arrangements for manufacturing composite metal by utilizing self-consuming electrodes.

Other objects are to protect the arc and to provide for ionization thereof in arc cladding. A more specific object is to supply slag forming and ionizing materials to an arc. A further object is to accomplish this continuously as the electrode is consumed.

Still another object is to supply electric current to a continuously consuming electrode without heating the length of the electrode and without excessive dissipation of energy therein.

Another object is to distribute the electric current in predetermined proportion to a plurality of simultaneously operating cladding electrodes, and to control the relative current supplied to the electrodes for balancing heating and cooling effects between the center and edges of a slab having a plurality of self-consuming electrodes laid thereon.

Still another object is to provide arrangements for applying a metallic coating of uniform thickness, mechanical properties and composition, with or without an intermediate layer of alloying elements, and which is free from blow holes, contamination with the air, irregularities in mechanical structure or hardness, weaknesses or other defects.

Other and further objects, features and advantages of the invention will become apparent as the description proceeds.

In carrying out the invention in accordance with a preferred embodiment thereof, composite metal is produced by depositing one or more layers of cladding metal upon a slab of base metal. This is accomplished by arranging a row of self-consuming electrodes side-by-side in parallel in a generally horizontal position upon the surface of a slab of metal. The electrodes are in rod form, or they may be in the form of relatively wide flat bars, and may be coated with insulating material, but preferably they are bare and a layer of fusible insulating material is placed between the electrodes and the slab surface. For protecting the arcs which are to be produced between the electrodes and the slab, the electrodes are covered with slag forming material in granular or gravel form. Either the insulating material or the slag forming material contains ionizing substances for maintaining the arc.

Electrical connections are made in each of the electrodes and usually to the slab for supplying electric current and sustaining the arc which is struck at the ends of each electrode. As the electrode is consumed, the metal of which it is composed is melted and deposits upon the surface of the slab to form a metallic coating.

A better understanding of the invention will be afforded by the following detailed description considered in conjunction with the accompanying drawings, and the scope of the invention will be set forth in the claims appended hereto.

In the drawings:

Figure 1 is a perspective view, partially schematic, of an arrangement for producing composite metal, illustrating the principle of operation of an embodiment of my invention.

Figure 2 is a side elevation, partially in section, illustrating composite metal manufacturing apparatus constituting an embodiment of my invention.

Figure 7 is an end elevation of another embodiment of my invention.

Figure 8 is a cross-sectional view of the same, taken on the line 8—8 of Figure 7.

Figure 9 is a fragmentary detailed cross-sectional view, taken on an enlarged scale, on the line 9—9 of Figure 7.

Figure 10 is a fragmentary cross-sectional view taken on the line 10—10 of Figure 9.

Figure 11 is a perspective view of an exemplary slab clamp.

Like reference characters are utilized throughout the drawings to designate like parts.

Figure 3:
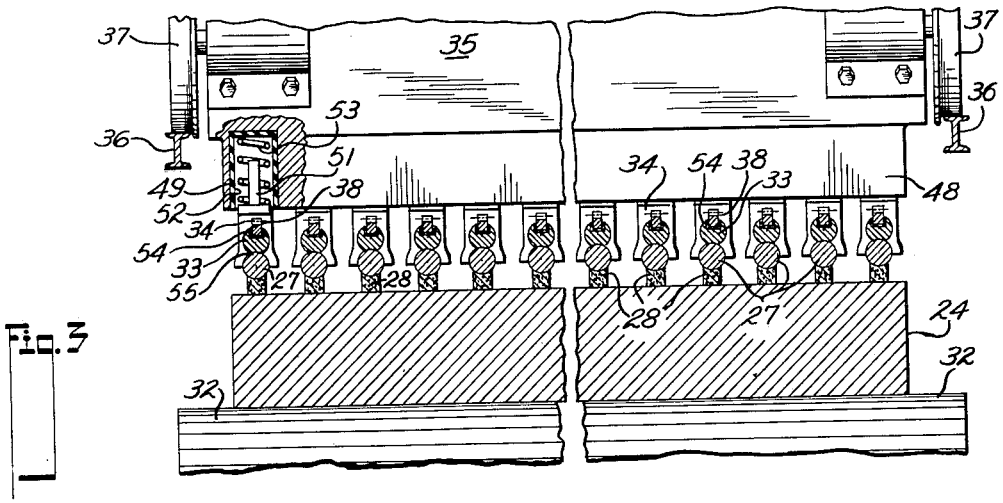
Figure 3 is a cross-sectional view of the portion of the apparatus of Figure 2, represented as cut by a broken plane 3—3.

My said co-pending application is itself a continuation-in-part of my application Serial No. 406,695, filed August 13, 1941, which has now matured into Patent No. 2,402,165, dated June 18, 1946. In said patent I have described and claimed certain arrangements for welding by the use of self-consuming electrodes.

In Figure 1 of my present application I have illustrated an arrangement for the application of the present invention to the making of composite metal. It is frequently desired to deposit a layer of metal of one composition on the surface of metal of a different composition. For example, stainless steel is deposited by electric arc fusion on a slab of ordinary low carbon steel prior to rolling so that after the slab has been rolled the resultant plate, sheet, or strip consists of a body of low carbon steel with a stainless steel surface.

This may be accomplished with the present invention by laying a series of electrodes 13 along the surface of a slab or the like 10. Preferably in the arrangement of Figure 1, the electrodes are provided with coatings 15 for forming a gaseous shield about the arcs although gaseous shielding material may be supplied to the arcs in other ways. The series of electrodes are then covered with flux 26 for confining the arcs by a slag shield and fused simultaneously depositing a layer of the electrode metal on the surface of the slab 10. The arcs are started at the ends of the electrodes 13 by wads of steel wool, filings or the like interposed between bared ends of the electrodes and the slab 10 or by carbon pencils. Each arc then progresses along the electrode as the electrode is consumed.

It is also feasible, in order to reduce the expense of the electrodes, to employ electrodes 13 of relatively cheap material, and add the alloying elements separately. For example, a layer 16 of ferrochrome and metallic nickel particles or the like may be spread upon the surface of the slab 10 before arranging the electrodes 13 thereon. The chromium, nickel or other alloying ingredients may be spread uniformly along the surface and ordinary steel electrodes 13 of a diameter to supply the desired amount of steel arranged thereon. The action of the arcs fuses the surface of the parent metal 10, the layer of alloying ingredients 16, and the metal of the electrodes themselves and allows the same to mix and alloy to form a uniform alloy layer of the desired composition and thickness.

In this application of the process it is preferred to connect one side of an electrical current circuit to each electrode 13 with the other side connected to the slab 10. This may be accomplished by providing a separate motor-generator for each electrode, or, when it is desired to use alternating current, a transformer may be provided for each electrode. As shown in Figure 1, transformers 17 may be connected to the three circuits of a three-phase system supplied by line wires 18, 19 and 20, so that each circuit supplies every third electrode through a transformer. In this way the load is balanced on the supply lines, and at the same time the heat developed by the arcs is balanced through each group of three electrodes, providing a steadier and more uniform heating of the slab 10 and the layer of alloying material 16.

The slag or flux shield which covers and confines the arcs may be a prefused non-gas-forming material. An excellent slag for cladding with stainless steel and similar metal comprises crushed finishing slag from an electric arc furnace. However, other materials which are prefused and which do not give off gas under the conditions attendant upon the cladding operation, may be used. Other materials, such as silica gravel, may also be employed. For cladding with materials or under conditions where the molten metal is not deleteriously affected by gas absorption, unprepared slags, which include limestone or other materials which give off non-oxidizing gases when melted, may be used.

The desired relation between the arc length, the rate of movement of the arc along the slab, and the rate at which electrode metal is added to the deposited metal, is obtained automatically with this process, eliminating the necessity of the nice correlation of these factors characteristic, for example, of hand and machine welding processes. The thickness of the coating 15 accurately and uniformly fixes the arc length, and the progression of the arc and the amount of electrode metal deposited are determined by the size of the electrode and the current density. Since each inch of weld is made by an inch of electrode, an electrode is selected having a cross-sectional area equal to the desired cross-sectional area of added metal in the weld, allowance being made as usual for the elements lost in the arc. I have used current densities of about 5,000 amperes per square inch of electrode to deposit the electrode on to the slab with a rate of arc travel of about 1 foot per minute. Higher current densities may be used to increase the rate of deposition.

Where the electrical connections are such as to permit a passage of current directly from one electrode to another, the electrodes are preferably spaced apart a sufficient distance to prevent such arcing across so that each arc passes between its electrode and the slab itself. The electrodes are kept sufficiently close to each other, however, so that the pools of the arcs run together so that the arcs travel at the same speed and a uniform penetration and coating composition is obtained across the entire surface of the slab.

The cooling of the fused metal is retarded by the protective arch formed over the deposit by the flux which has been melted by the heat of the arc, resulting in a substantial decrease in hardness where alloy steel is being deposited. When desired, an excess of flux may be employed to partially insulate the molten layer of flux from the atmosphere and further retard the cooling. An excess of flux may also be used to conceal the arc from view so as to "blackout" the cladding operation from enemy observation.

From the apparatus standpoint, there are a number of ways in which my processes may be carried out, and I have illustrated herein by way of example two different apparatuses. These apparatuses are quite different in appearance and yet they operate fundamentally in the same way. The primary difference between these apparatuses is that in the apparatus of Figures 2 to 5 inclusive, a moving contact is established between the current source and the electrodes (i. e. the contact is moved along the electrodes in advance of the arc as the latter progresses), and the flux covering is applied in the same way as the arc progresses, whereas in the apparatus of Figures 7 to 15 inclusive, the entire slab and electrode assembly is covered with flux, and a series of contactors are provided along the length of the slab and these are raised in sequence as the arc approaches them. The apparatus of Figures 2 to 5 inclusive will first be described.

Figure 3 illustrates an arrangement which has been found to be satisfactory in carrying out this process with the use of bare, instead of coated, electrodes. In this arrangement a bare electrode 27 is laid upon the slab and held spaced therefrom by a layer of insulating material 28. In one embodiment, this may be a strip composed of the material ordinarily used for the coating 15 on the covered electrodes, interposed between the electrode and the slab 24. The strip 28 is made of a uniform thickness to space the electrodes the desired distance from the slab 24, and of sufficient width to prevent the electrode from contacting the slab and shorting the electric circuit. The strip of material 28, like a conventional coating for weldrods, may consist of paper, wood flour, or other cellulosic material impregnated with sodium silicate, calcium oxide and magnesium oxide, or other slag forming and ionizing elements. If desired the silicates or other elements usually present in the electrode coatings which produce a fluxing slag may be omitted from the coating 15 or the strip 28, since the arc is completely shielded and the deposited metal is protected as it cools by the slag coating provided by fusing of the flux 26 (Figure 2). Alternatively, the electrodes may be spaced and insulated from the slab by a layer or strip of the same material used as an over flux, or any similar fusible insulating and fluxing material.

The secondary windings of the transformers 17 are preferably Y connected, having what amounts to a grounded neutral connection since the base plate or slab 10 is in effect grounded as represented schematically by a ground connection 14. However, as shown, each of the secondary windings is preferably connected at one end directly to the slab 10 in order that sufficient current may efficiently be supplied to the electrodes.

In the arrangement of Figure 1, the slab 10 is relatively narrow and a large number of relatively short electrodes 13 are laid side-by-side across the plate or slab 10. However, my invention is not limited to the specific arrangement illustrated in Figure 1. For example, as illustrated in Figures 2 and 3, electrodes, in this case represented by bare electrodes 27, may also be laid lengthwise of a relatively long slab 24. In this manner, few electrodes need be handled, and the process and operations may more readily be carried out mechanically.

In the arrangement of Figure 2, the slag-forming flux is fed to the slab 24 as the row of arcs progresses from one end of the slab to the other. In order to avoid dissipation of energy in the portion of the electrode away from the arc, and to avoid premature destruction of the strip 28 by heating any part of the electrode except that adjacent the arc, means are provided for progressively moving the point of application of electrical current to the electrode as the arc progresses.

The apparatus of Figures 2 and 3 comprises a suitable platform 31 carrying a plurality of rotatable rollers or wheels 32 for supporting a slab 24, which is to be coated to form a composite metal slab. A plurality of conductors 33, each terminating in a contact shoe 34 is provided for supplying electrical current to the electrodes 27, and a movable hopper 35 is provided for supplying the flux 26 to the arcing electrodes and covering the arcs.

Figure 6:
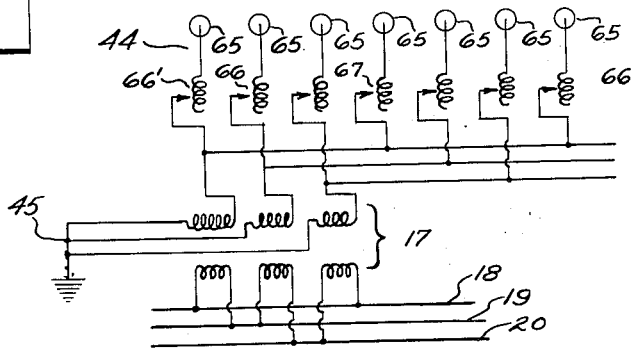
Figure 6 is a circuit diagram illustrating electrical connections for the apparatus of Figures 2 to 5.

For movably supporting the hopper 35, suitable means are provided such as a pair of rails 36 mounted on either side of the platform 31, a pair of main supporting wheels 37 carried by the hopper 35, and a pair of guide wheels or balance wheels 37', also carried by the hopper 35, the wheels 37 and 37' being adapted to roll upon the rails 36. For moving the hopper 35 and withdrawing the contact shoes 34, as the arcs progress, a series of racks 38 is provided, each mechanically secured to one of the contact rods or conductors 33, and each having a driving pinion 39 enmeshed therewith. The pinions 39 are keyed to a common drive shaft 41 powered by a suitable means such as an electric motor (not shown). For separately feeding electrical power to each of the conductor rods 33, separate insulated stationary contacts or shoes 43 are provided, each of which, in turn, is connected to one of the branch circuits 44 of the secondary side of the supply transformers 17 represented in Figure 6. It is to be understood that the ground or neutral connection 45 of the secondary windings of the transformers is in practice directly connected to the slab 24 through high conductivity contacting means (not shown).

A table 46 is provided for supporting the contacts 43 and other associated apparatus including the conductors 33 and the racks 38.

The hopper 35 is provided with an elongated spout 47 extending transversely across the slab 24 for delivering the slag-forming material 26 to the slab 24. As illustrated more clearly in Figure 3, the hopper 35 has formed therein or secured thereto a housing or casing 48 having a plurality of chambers 49 therein for positioning the contact shoes 34. Each such contact shoe 34 has an upwardly extending locating rod 51 secured to the shoe 34 and has a suitable insulating mechanical connection such as a block of insulating material 52. For resiliently biasing the contact shoe 34 downward to give the requisite degree of contact pressure between the electrode 27 and the shoe 34, suitable means such as compression springs 53 are provided.

Each of the contact shoes 34 is electrically connected to the end of the corresponding conductor rod 33, as well as being mechanically connected thereto. Each of the racks 38 is also mechanically connected to the corresponding conductor rod 33, and is insulated therefrom. For example, as illustrated, the upper surface of each rod 33 may be grooved to receive the rack 38 and a layer of suitable insulating sheet material 54 is interposed between the rack and the conductor rod. Suitable mechanical connecting means such as insulated screws or the like (not shown) are provided for effecting a rigid mechanical connection between the rack 38 and the conductor rod 33.

The hopper 35 is mechanically connected to the contact shoes 34, although insulated therefrom for the purpose of causing the hopper 35 to be rolled along the rail 36 as the rack 38 is retracted to retract the contact shoes 34. This mechanical connection between the contact shoe 34 and the hopper 35 is effected by the fitting of the insulated rod 51 of each shoe 34 within the rack housing 48. Preferably the lower side of each conductor rod 33 is cut away to form a cylindrical segmental slot 55 fitting the top surface of the electrode 27, which prevents electrical contact except at the shoes 34.

For locating the slab 24 and holding it in a fixed position as the cladding operation is being performed thereon, an end stop is provided for the slab 24. Preferably the table 46 is arranged to serve as the end stop. Insulation of the slab 24 from the table 46 is preferably effected by providing a suitable insulating insert 56 for the end of the table composed of slag, asbestos board, or other refractory insulating material. For similarly locating the electrodes 27 and preventing movement thereof during the cladding operation, an end stop 57 is secured to the surface of the table 46. The stop 57 may take the form of a strip of insulating material such as a phenolic condensation product or fabric impregnated with plastic insulating material extending transversely across the table 46. Preferably, the ends 58 of the electrodes 27 overhang the slab 24 sufficiently to permit the contact shoes 34 to be moved beyond the ends of the slab 24 in order that the arcs may continue from one end of the slab to the other, in order that the entire top surface of the slab may be coated.

Suitable means are provided for securing the contact shoes 43 in a fixed position on the table 46 and insulating them from the table 46. For example, they may be laid in troughs composed of insulating material 59 and secured by means of terminal studs 61 extending downwardly through suitable openings in the table 46, and insulated by means of insulating bushings 62.

Figures 4, 5:
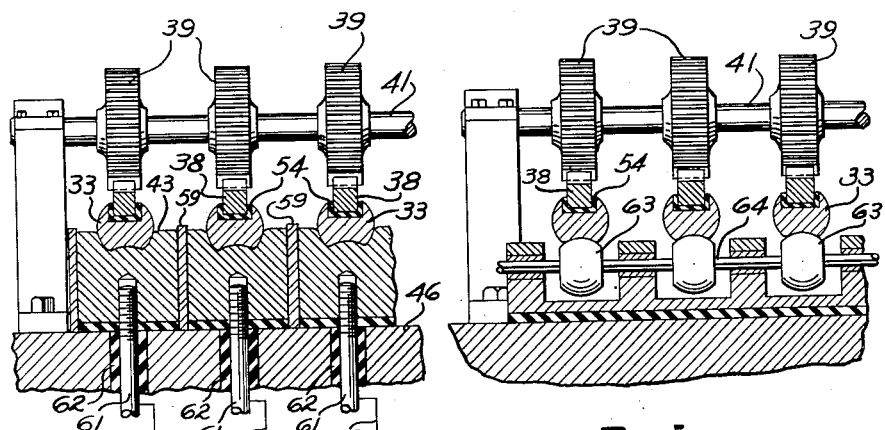
Figure 4 is a cross-sectional view of the portion of the apparatus of Figure 2, represented as cut by a plane 4—4.
Figure 5 is a correspondingly fragmentary cross-sectional view as cut by a plane 5—5 indicated in Figure 2.

For supporting the racks 38 and the conductor rods 33 as they are retracted along the slab 24, a series of suitable rollers 63 or the like shown in Figure 5 may be provided, each consisting of a portion of a spherical roll, being composed of suitable insulating material and being mounted upon a rotatably-mounted shaft 64.

In order that the current in each electrode 27 may be maintained constant without interaction of the current in one arc upon that of another, each terminal stud 61 preferably has a separate electrical connection 65 thereto. A single set of transformers 17 may be utilized for supplying the conductors or connections 65, but preferably branch circuits are formed by means of impedance isolation of each connection 65. Thus, suitable impedance devices such as choke-coils 66 may be interposed in series with each connection 65. For equally loading the phases of the transformers 17 successive choke-coils 66 are connected to different transformers, each third choke-coil being connected to the same transformer out-put line.

For enabling individual adjustment of current in each arc, the choke-coils 66 are preferably adjustable, for example having adjustable taps 67. It is to be understood that for simplicity in the drawing some of the connections and choke-coils have been omitted in Figure 6. Likewise in Figure 3 the middle portion of the apparatus is broken away.

My invention is not limited to the use of any particular dimensions. However, I have found that when a 4-inch slab approximately 30 inches wide by 18 feet long is to be coated, successful results may be obtained by utilizing 15 electrodes laid side-by-side and connected in 15 different branch circuits through 15 choke-coils. Owing to the fact that the electrodes at the two sides or edges of the slab 24 are subjected to a greater cooling effect, and do not receive heating from both sides, I prefer to provide means for supplying additional heat to the side electrodes as by increasing the electrical power to them. For example, this may be accomplished by supplying additional current by setting the choke-coil 66' so as to have lower impedance than the remaining choke-coils 66.

In coating a 4-inch slab which is 30 inches wide and 18 feet long, satisfactory results may be obtained by utilizing 15 1-inch electrodes resting upon insulating strips $\frac{1}{16}$ of an inch thick. In such arrangement with a current density of 3500 amps. per square inch, a burning speed of from 12 inches to 24 inches per minute of the electrode is obtained. The electrode has a composition such that when alloyed with the slab, it will give a surface coating of the desired composition, taking into consideration that the dilution may be from 10% to 50%, depending upon the elements employed and the conditions of operation.

The insulating strip or layer may contain calcium fluoride or sodium fluoride as an ionizer for sustaining the arc. However, the invention is not limited to providing the ionizer in the electrode insulating material. This ionizing substance may also be provided in a prefused slag-forming granular flux.

In the course of the operation of the apparatus of Figures 2 and 3, the hopper 35 and the conductor rods 33, are moved to the right so that after a slab has been completely coated, the hopper 35 is entirely above the table 46. The completed slab is removed by sliding it to the left, and a fresh slab to be coated is moved into place by inserting it from the left. Since the hopper 35 is still in position completely to the right above the table 46, the top surface of the fresh slab to be coated is exposed. The rows of strips 28 of insulating material are then laid upon the slab 24, and the electrodes 27 are laid upon the strips 28 with the ends of each electrode resting against the insulating stop 57, and inserted under the contact shoe 34. If there is any flux remaining in the hopper 35, the spout 47 is closed by shutting a lower door (omitted from the drawing for the sake of simplicity). A temporary stop is clamped at the left-hand end of the slab against the left ends of the electrodes 27 and the gear wheels 39 are rotated in the reverse direction to move the hopper 35 and the contact rods 33 toward the left-hand end of the slab 24. When the hopper 35 has reached a position about as far to the left as that shown in Figure 2, the rotation of the gears 39 is stopped, the clamps are moved from the left-hand end of the rods 33, the hopper 35 is recharged with flux and the spout 47 is opened.

For enabling arcs to be started, lengths of wire may be wrapped around the ends of the electrodes 27 and laid in contact with the slab 24.

After sufficient flux has been discharged to form the pile of slag-forming material 26 at the left-hand end of the slab 24 as shown in Figure 2, current is connected to the transformers 17 so as to start the arcs and thereupon power is applied to the drive shaft 41 for causing the hopper 35 to move to the right, and for causing the conductor rods 33 to be withdrawn gradually at approximately the same speed as the arc progresses along the slab 24. Additional slag-forming material is continuously discharged from the spout 37 of the hopper 35 as it moves to the right so that the arc is constantly protected against spattering and kept stable in position.

Since the contact shoes 34 always remain relatively close to the arc, the resistance drop in the electrode 27 is relatively small, and only the end portion of the electrode becomes heated so that the insulating material 28 is not destroyed until the arc approaches it. The portion of the electrode 27 between the contact shoe 34 and the terminal shoe 43 remains cool owing to the fact that no current flows in this portion of the electrode. The presence of the slag around the arc and the ionizing gases for maintaining the arc serve to protect the molten material from contamination from the atmosphere, and prevent the spattering or blowing of the arcs so as to form blow-holes, and thus, also accomplish the freedom from irregularity and weakness. Owing to the uniformity with which the operation proceeds, a uniform coating is produced which is uniform not only as to thickness and mechanical properties but also as to degree of alloying and chemical composition.

As the rolling mechanism approaches the extreme right-hand position, the arcs reach the right hand end of the slab 24 and are thereupon confronted by the insulating block 56 which breaks the electrical circuits between the electrodes 27 and the slab 24, so that the arcs are extinguished.

The short lengths of electrode 27 remaining under the contact shoes 34 are then removed, a completed composite metal slab 24 is rolled away to the left, and the apparatus is in condition for the coating of a fresh slab by repetition of the operations already described.

In carrying out the process with this apparatus, as in the embodiment illustrated in Figure 1, all of the arcs are started simultaneously and progress together across the slab. The electrodes are kept sufficiently close to each other so that the pools of the arcs join forming in effect a single pool in the form of a strip across the slab and moving uniformly throughout the length of the slab. The electrodes are preferably spaced, however, a sufficient amount to prevent arcing between the electrodes in the event the electrical connections are such as to permit such arcing. Because of the fact that each arc is helped by the other arcs in the series, the penetration of the welds is uniform throughout the entire surface of the slab resulting in a coating of uniform thickness and composition. The joining of the pools also helps to keep all of the arcs moving at the same speed against any tendency of one arc to slow down or run ahead of the remaining arcs. In this way there is no opportunity for the heat to run ahead of the arcs in the slab to any substantial extent so that after the arcs have moved about an inch or so along the slab the temperature of the slab in advance of the arcs is uniform throughout the remainder of the length of the slab. Thus the penetration of the arcs is uniform throughout the entire length of the slab as well as across its width, resulting in a high degree of uniformity of the thickness and composition of the coating.

In the embodiment of Figures 7 to 15 inclusive, I have shown a framework having a longitudinal opening therethrough, through which a slab to be treated may be brought into the apparatus and removed from the apparatus. While the ends of the frame could be closed and the slab inserted and removed laterally, the structure shown lends itself better to straight line production methods. Mounted for vertical movement at the top of the frame longitudinally thereof is a series of carriers for the contactor bars which carry the cladding current to the electrodes. In the particular embodiment shown each carrier carries six contactors but this will be varied depending upon the number of electrodes. A lever mechanism is provided for each carrier so that as the arc approaches a set of contactors its carrier may be raised out of the way. Current of course is then brought to the electrodes through the remaining contactors, but it will be clear that there is always a set of contactors fairly close to the arc, whereby heating up of the electrodes beyond the arc is avoided. In this particular embodiment I have shown square electrodes as distinguished from the rod-like electrodes of the previously described embodiment, but of course rectangular or flat, broad electrodes may also be used.

Figure 15:
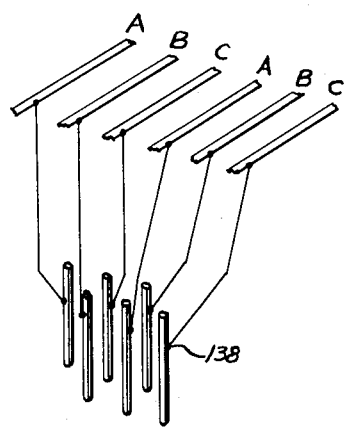
Figure 15 is a diagrammatic perspective view showing how the contactor bars of Figures 7 to 13 are connected.

At the top of the frame there are shown six bus bars which are connected to the three phases of a source of 3-phase current with the first and fourth bus bars connected to phase A, the second and fifth to phase B, and the third and sixth to phase C (see Figure 15).

Figure 12:
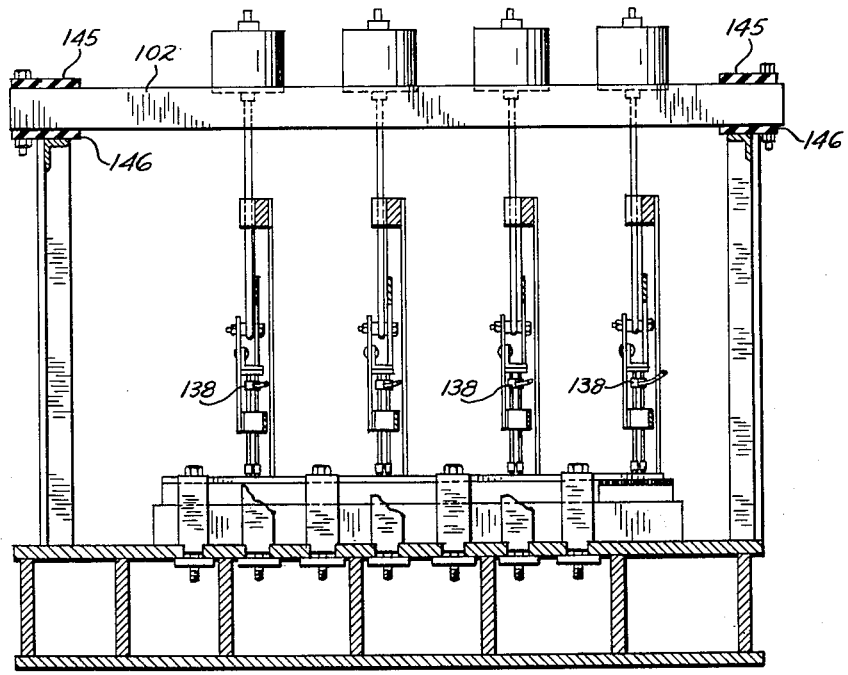
Figure 12 is a vertical cross-sectional view taken on the line 12—12 of Figure 7.
Figure 13:
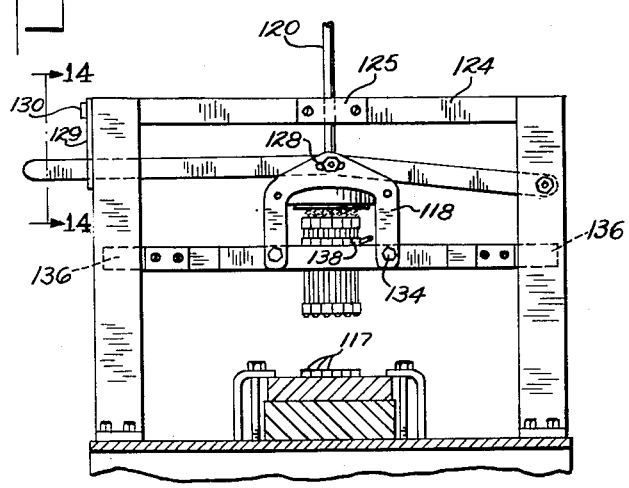
Figure 13 is a vertical cross-sectional view taken on the line 13—13 of Figure 8.
Figure 14:
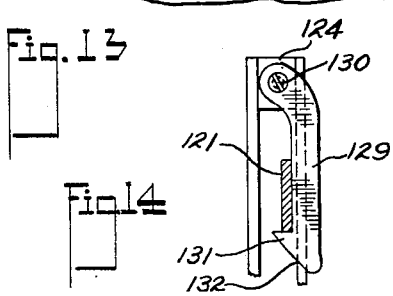
Figure 14 is a detailed cross-sectional view on an enlarged scale, taken on the line 14—14 of Figure 13.

As shown in Figures 7, 8 and 12 the apparatus according to this embodiment comprises a base structure indicated generally at 100 from which rises the supporting corner members 101 connected by the cross-beams 102. The base structure 100 is provided with leveling jacks 103 at its corners so that the slab support may be adjusted to any desired position. The slab is indicated at 104 resting upon a support 105. It may be clamped in position by the clamps indicated generally at 106 and shown in detail in Figure 11. Such clamps may comprise a bolt 112 and nut 113 and the angle member 114 having the tongue 115. The base plate 100a of the support is slotted as at 116 and the bolts 112 pass through the slots 116 and the tongues 115 enter into said slots. The nuts 113 are of sufficient size that they will not pass through the slots. In some instances it will not be necessary to clamp the slab in position, and, as a matter of fact, in some cases bolting the slab down may tend to cause cracking. Therefore, the clamping means disclosed herein are for use in such cases where the clamping is found to be necessary or desirable.

Electrodes are indicated at 117 and in the particular embodiment shown six such electrodes are placed side by side upon the slab and extending beyond the slab at one end as indicated at 117a.

For conducting the current to the electrodes, I employ a plurality of contactor bars which in this instance are grouped in groups of six. By reference to Figures 8 and 10 it will be clear that because of the relatively close spacing between the electrodes the contactor bars are disposed in a staggered condition in two rows of three. It will be understood, however, that if broader electrodes were used the contactor bars could be arranged in a single row and three contactor bars would suffice.

The electrodes shown are square in cross-section and in actual practice I have used such electrodes which were ⅜" square. I have also used in practice broad electrodes which were ¾" thick and were 5½" wide. With such electrodes a single row arrangement of contactor bars is perfectly feasible.

Each group of electrodes is mounted in a carrier comprising an inverted generally U-shaped member 118 provided with a pivot bolt 119. Pivoted on the bolt 119 is the rod 120 and the lifting lever 121. Securely bolted to the end of the rod 120 is a weight 122.

A series of frame members, one for each carrier, are provided, each comprising the spaced upright members 123, 123a, which are connected across the top by the members 124. The members 124 are provided with the bearing brackets 125 through which the rods 120 pass and which serve to maintain them in vertical alignment.

Each of the levers 121 is pivoted as at 126 between a pair of the members 123, 123a and its opposite end 127 extends between an opposite pair of members 123, 123a. Upward movement on the handle end 127 of a lever 121 raises that carrier and its contactor bars, which will be described hereinafter. Since the point 119 has arcuate movement about the pivot point 126 the slot 128 in the member 118 is elongated to avoid binding. A gravity latch 129 pivoted at 130 to the cross member 124 has the catch portion 131 (Figure 14) of the cam surface 132 whereby when the lever 121 is raised the latch 129 will swing to the right and then engage under the lever to hold it in its raised position.

Coming now to a description of the mounting of the contactor bars themselves, a block of insulating material 133 is secured by means of bolts 134 to each of the members 118. Bars 135 also bolted to the blocks 133 extend laterally and enter between the respective members 123 and 123a on each side as indicated in broken lines at 136 in Figures 7 and 13. The members 136 thus ride between the members 123, 123a, which serve as guides therefor. The contactor bars themselves indicated at 137 are carried in pairs in the blocks 133. The electric cables from the bus bars are connected to the contactor bars by means of the clamping collars 138 which prevent the contactor bars from falling out through the holes in the block 133. A bracket 139 is secured to the member 118 as by riveting or the like at 140, and carries an insulating pad 141. As best seen in Figure 9, sleeves 142 are welded or otherwise suitably secured to the ends of the contactor bars to act as retainers for the compression springs 143. Thus when a carrier 118 is lowered onto the slab by disengaging the catch member 129, the weight 122 presses the C-shaped member downward and the force is transmitted through the bracket 139 and the springs 143 to the contactor bars, thus providing for the equalization of pressures, so that each individual contactor bar is brought into firm contact with its particular electrode. When a carrier is raised the springs 143 tend to force the contactor bars downwardly until the clamping collars 138 come to rest on the block 133.

I have shown six bus bars in Figure 7 indicating by the reference numerals 144. As shown in Figure 15 these are connected to the 3-phases of a 3-phase source of power, and the bus bars are connected to the contactor bars as clearly shown in Figure 15. The connecting cables have been omitted in the other figures for the sake of clarity. The bus bars are clamped between insulating plates 145, 146, which are supported upon the members 102.

By reference to Figure 8 it will be observed that one group of contactor bars contacts the electrodes beyond the end of the slab. This is in order to permit of cladding the slab all the way to its end while still having contact with the electrodes.

In practice the insulation is applied to the slab to be treated and the electrodes are then laid in place. The insulation preferably consists of a layer of granular flux such as crushed electric furnace finishing slag, or the like. The contactors are positioned on the electrodes and steel filings, or the like, are piled across the front end of each electrode for the purpose of starting the arc. The entire slab and the electrodes are then covered with granular flux which may be held in place by dams if desired. When the arcs are started by means of the steel filings, or millings, they travel along the length of the slab as the cladding operation proceeds, and each succeeding set of contactors is raised as the arcs approach within a few inches of them by operating the appropriate lever 127. This method of contacting has the same effect as the rolling contact method described above in that it prevents overheating of the cladding material and premature melting of the insulating flux by making it unnecessary for the heavy current to pass through more than a short-length of cladding material to reach the arcs.

While I have shown and particularly described herein certain embodiments of my invention and certain methods of operation embraced therein, by way of example, it will be clear to those skilled in the art that many modifications and variations are possible. It is my intention not to limit myself to the specific embodiments described except insofar as they are set forth in the claims which follow.

Having now fully described my invention, what I claim as new and desire to secure by Letters Patent is:

1. Apparatus for cladding a slab of metal comprising a support for a slab to be clad, a plurality of contactor carriers, a plurality of electrode contactors supported by each carrier, means suspending said carriers in longitudinally spaced relationship along and above said slab support, said carrier suspending means including means for selectively shifting each carrier and associated contactors to an open circuit position, a source of welding current, electrical connections between said source of welding current and said contactors, and other electrical connections to said current source and adapted to make electrical connection with a slab mounted on said slab support.

2. An apparatus for the purpose described, comprising a frame having an opening through which a slab to be treated may be inserted, a support for a slab within said frame, a plurality of longitudinally spaced carriers suspended from said frame for vertical motion with respect thereto, means for selectively raising and lowering said carriers individually, a set of contactors resiliently mounted on each of said carriers, a set of bus bars disposed longitudinally of said frame at the top, and flexible connections from said bus bars to the contactors in each of said sets.

3. An apparatus according to claim 2, in which each carrier carries six contactors, and in which there are six bus bars, the first and fourth, the second and fifth, and the third and sixth of said bus bars being connected respectively to the three phases of a source of three-phase current.

4. An apparatus according to claim 2, in which said contactors are individually spring-mounted to equalize their contact pressure.

5. An apparatus according to claim 2, in which the means for raising and lowering said carriers comprises a linkage terminating in a lever extending laterally from said frame, for each said carrier.

6. In an apparatus of the class described, having longitudinally spaced sets of contactor bars, each of said sets being actuated by a single element, means for producing substantially equal contact pressure on each bar of a set comprising an individual spring mounting for each contactor bar with relation to said element.

7. A cladding assembly comprising a slab to be cladded, a continuous layer of fusible insulating material lying on said slab, a plurality of elongated cladding electrodes of a relatively small volume with respect to the volume of said slab disposed side-by-side in spaced relation on said insulating material, said electrodes being arranged substantially parallel to each other and substantially parallel to the slab, each of said electrodes being adapted to be engaged by a series of contactors longitudinally thereof, and a layer of granular fluxing material completely covering said electrodes and slab, for the purposes described.

8. An assembly according to claim 7, in which said fluxing material is electric furnace finishing slag.

9. Apparatus for producing a composite slab of metal comprising means for supporting an assembly including a base slab of metal and a plurality of elongated electrodes with the upper surface of said assembly in a substantially horizontal plane, a plurality of electrical contacts arranged above said supporting means each of said contacts being adapted to engage and make electrical contact with a side surface of an electrode included in an assembly supported by said supporting means, means for supplying electrical current to said contactors and to a slab supported by said supporting means, and means for moving said contactors away from the arcing ends of electrodes included in an assembly carried by said supporting means as said electrodes are consumed.

10. Apparatus for producing a composite slab of metal comprising means for supporting an assembly including a base slab of metal and a plurality of elongated metal electrodes disposed longitudinally thereabove with the upper surface of such assembly disposed in a substantially horizontal plane, a plurality of electrical contactors disposed above said supporting means and aligned in a transverse row, said contactors being adapted to engage and make electrical contact with side surfaces of electrodes included in an assembly carried by said support, means for supplying electrical current to said contactors and to a slab supported by said supporting means, and means for moving said contactors away from the arcing ends of electrodes included in an assembly carried by said supporting means as such electrodes are consumed.

11. Apparatus for producing a composite slab of metal comprising means for supporting an assembly including a base slab of metal and a plurality of elongated metal electrodes disposed longitudinally thereabove with the upper surface of such assembly disposed in a substantially horizontal plane, a plurality of electrical contactors disposed above said supporting means and aligned in a transverse row, said contactors being adapted to engage and make electrical contact with side surfaces of electrodes included in an assembly carried by said support, means for supplying electrical current to said contactors and to a slab supported by said supporting means, impedance means respectively connected in series with said contactors for electrical isolation of said contactors, those of said impedances connected to intermediate contactors having substantially the same impedance, and those impedances connected to the end contactors having reduced values of impedance for supplying additional current to the end electrodes, and means for moving said contactors away from the arcing ends of electrodes included in an assembly carried by said supporting means as such electrodes are consumed.

12. Apparatus for producing a composite slab of metal comprising means for supporting an assembly including a base slab of metal and a plurality of elongated metal electrodes disposed longitudinally thereabove with the upper surface of such assembly disposed in a substantially horizontal plane, a plurality of electrical contactors disposed above said supporting means and aligned in a transverse row, said contactors being adapted to engage and make electrical contact with side surfaces of electrodes included in an assembly carried by said support, a common current source for supplying current to said slab and to said contactors in parallel, means for causing the electrical power supplied to the end contactors in the row to be relatively greater than that supplied to intermediate contactors, and means for moving said contactors away from the arcing ends of electrodes included in an assembly carried by said supporting means as such electrodes are consumed.

13. Apparatus for producing a composite slab of metal comprising means for supporting an assembly including a base slab of metal and a plurality of elongated electrodes with the upper surface of said assembly in a substantially horizontal plane, a plurality of electrical contactors arranged above said supporting means each of said contactors being adapted to engage and make electrical contact with a side surface of an electrode included in an assembly supported by said supporting means near the arcing end of such electrode, means for supplying electrical current to said contactors and to a slab supported by said supporting means, a hopper with a discharge spout adapted to feed slag forming material, means for supporting said hopper above said slab support and means for relatively moving said hopper and said contactors with respect to an assembly carried by said supporting means in the direction of the length of the elongated electrodes included in such assembly and away from the arcing ends of such electrodes.

ROBERT E. KINKEAD.

REFERENCES CITED

The following references are of record in the file of this patent:

UNITED STATES PATENTS

| Number | Name | Date |
|---|---|---|
| 2,151,914 | Hopkins | Mar. 28, 1939 |
| 2,191,469 | Hopkins | Feb. 27, 1940 |
| 2,191,481 | Hopkins | Feb. 27, 1940 |
| 2,220,576 | MacKusick | Nov. 5, 1940 |

FOREIGN PATENTS

| Number | Country | Date |
|---|---|---|
| 282,527 | Great Britain | Dec. 29, 1927 |